Feb. 18, 1941. J. N. CRIDER 2,231,886
METHOD OF PRESERVING DRESSED AND DRAWN FOWL
Filed Dec. 12, 1936 2 Sheets-Sheet 1
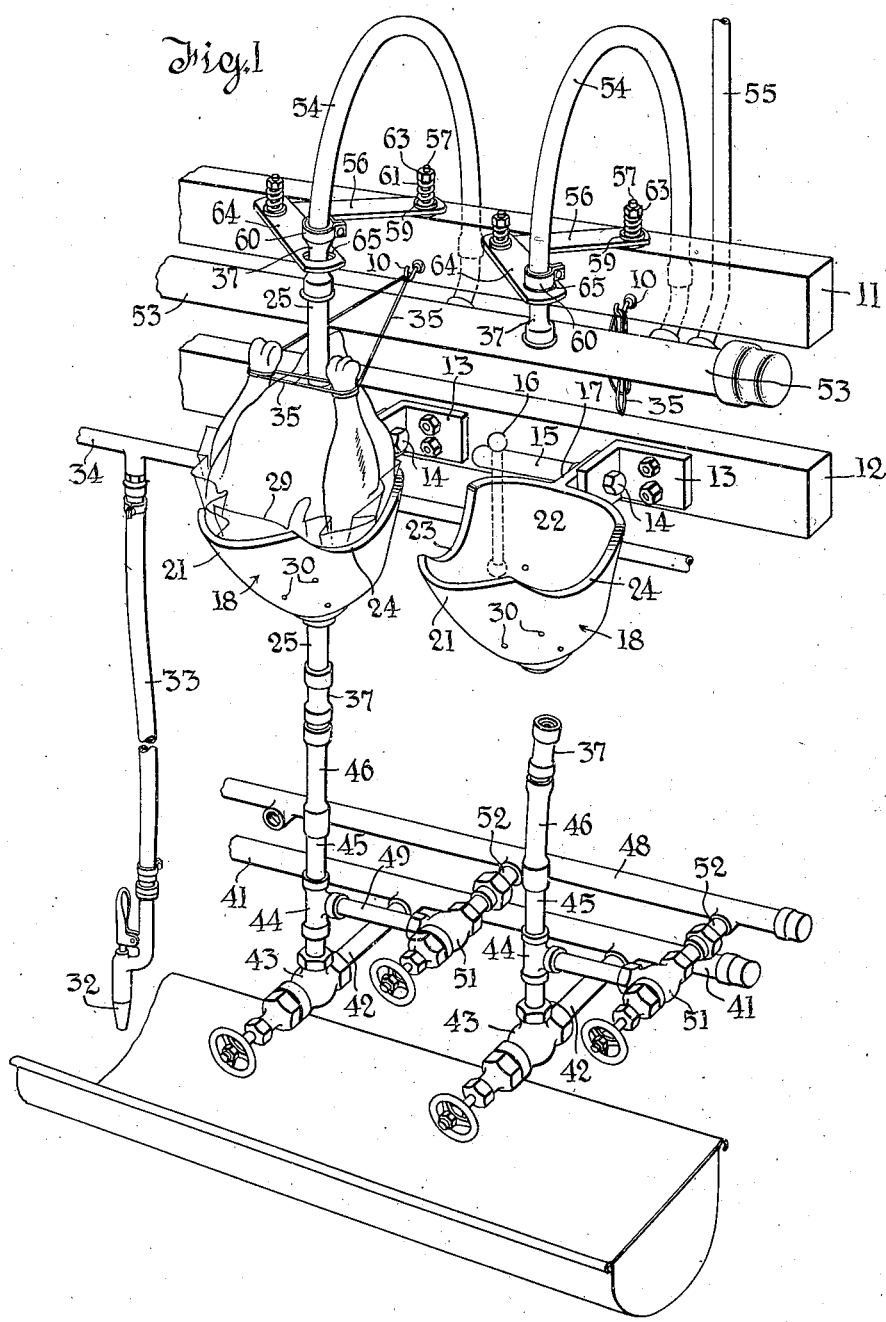
Inventor
John N. Crider
By Dodge and Sons,
Attorneys Feb. 18, 1941. J. N. CRIDER 2,231,886
METHOD OF PRESERVING DRESSED AND DRAWN FOWL
Filed Dec. 12, 1936   2 Sheets-Sheet 2
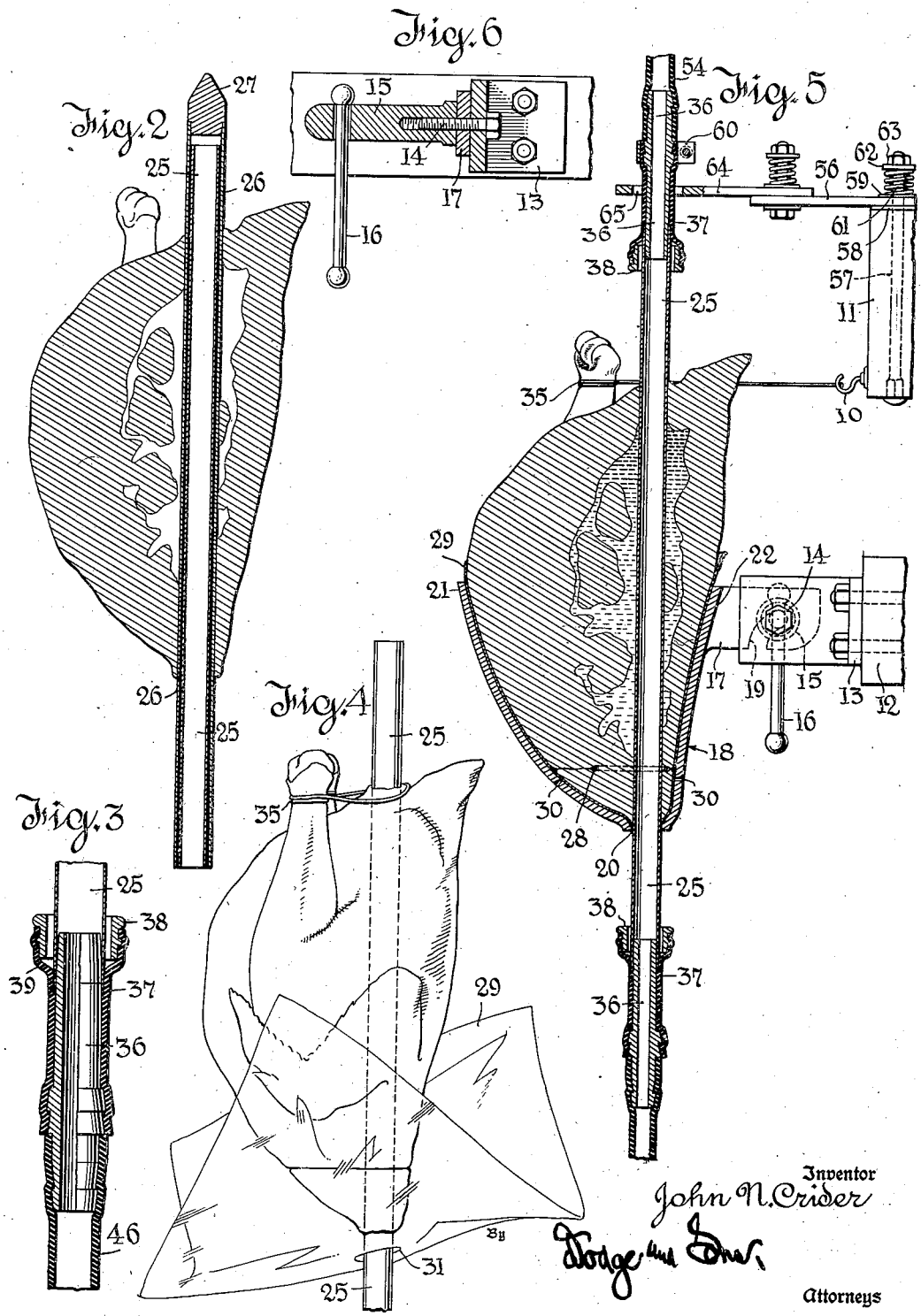
Inventor
John N. Crider
By Dodge and Sons
Attorneys Patented Feb. 18, 1941

2,231,886

UNITED STATES PATENT OFFICE 2,231,886

METHOD OF PRESERVING DRESSED AND DRAWN FOWL

John N. Crider, Astoria, Long Island, N. Y.

Application December 12, 1936, Serial No. 115,617

3 Claims. (Cl. 99—194)

This invention pertains to an improved method of preserving dressed and drawn fowl by refrigeration.

The invention is an improvement in the method disclosed and claimed in Letters Patent No. 1,797,606, granted to me under date of March 24, 1931. While the method and apparatus set forth in said patent proved satisfactory, the improved manner of handling the fowl as herein shown and described, has been found superior both as to facility of operation in carrying out the method, and the appearance and form of the final product.

Broadly considered, the invention employs the method set forth and claimed in the aforesaid patent, that is to say, the fowl is dressed and drawn, a tube for a freezing medium extended through the carcass and the cavity therein, the cavity filled with water, and the water thereafter frozen so that the fowl when the freezing has been completed, contains a block of ice which completely fills and conforms to the cavity within the fowl and around and about the tube.

In the patent, as will be noted upon examination of the same, the fowl was suspended in space by its legs from hooks; whereas in the present case, the weight of the water filled fowl is supported in and by a form which, as the carcass is frozen, tends to maintain the proper shape or configuration, particularly of the breast and back of the carcass. Furthermore, there is no elongation and malformation of the carcass by reason of the fact that it is suspended by its legs, as was the case in the patent above referred to. On the contrary, the weight of the carcass plus the weight of the water placed in the cavity acts to settle the carcass wihin the mold, and thus acts to reshape the carcass, distortion of which may have been brought about through the cleaning and tube placing operations.

Moreover, in the present case, means is provided for readily inserting and positioning the freezing tube which passes through the cavity within the carcass. Means is likewise provided whereby the legs of the fowl are drawn inwardly close to the body, and the wings are also held close thereto, this latter through contact with the form or mold in which the carcass rests.

The tube in the present instance is produced from paper, paraffined or otherwise treated to render it impervious to the refrigerant which is forced therethrough, and likewise to inhibit any deleterious action upon the fowl where it contacts the same.

Means is also provided for preventing the carcass from being frozen to the form, and after the water within the cavity in the carcass is frozen, the carcass is submitted to a glazing operation, and finally placed in a bag which is impervious to air and which will have no deleterious effect upon the carcass which it surrounds.

With these and other objects and advantages in view, reference will be had to the annexed drawings, wherein:

Figure 1 is a perspective view of a portion of the apparatus whereby the method of the present case may be effected, it being understood that but two units are shown and that ordinarily a greater number will be placed upon the line;

Fig. 2, a transverse sectional view of a cleaned carcass of a fowl, showing the means employed for inserting the paper tube which is utilized as a conduit for the passage of the freezing medium;

Fig. 3, a longitudinal sectional view of one of the couplings employed in the line for effecting a tight joint between the end of the freezing tube and the respective inlet and outlet lines for the refrigerant;

Fig. 4, a side elevation of the carcass with the freezing tube extending therethrough and showing a sheet which is employed to prevent the carcass from freezing against the mold in which it is seated, the legs of the fowl being shown as drawn together as by a rubber band;

Fig. 5, a vertical sectional view taken through the carcass, showing water within the cavity thereof, the freezing tube extending therethrough, and the carcass seated within the combined mold and support; and Fig. 6, a detail view of the means employed to secure the mold in position with reference to a rack or support.

Inasmuch as the parts are duplicated throughout and ordinarily a plurality, say twelve or more of the forms will be connected in with a common line for the freezing medium as well as an exhaust line therefor, reference will be made to one complete unit throughout and the same reference letters will be applied in the different figures.

Referring first to Fig. 1, 11 and 12 are bars which are secured to any suitable support, as for instance vertical studding or the like (not shown).

Secured to the bar 12 are L-shaped brackets 13, the forward element whereof (see more particularly Figs. 5 and 6) has an opening formed therein in which is mounted a machine screw 14 rigidly affixed to the forwardly extending member of bracket 13, so as to prevent rotation thereof.

On the outer end of the screw there is mounted a nut 15 carrying a bar 16 which is free to slide through the opening in which it is mounted and to afford ready means for tightening or loosening the nuts. The nuts and the forwardly extending member of the bracket are designed to coact with a member 17 extending rearwardly from the upper portion of the combined carcass mold and support, which is designated as a whole by 18.

As will be seen upon reference to Fig. 6, the nut 15 when screwed up upon the bolt, clamps the member 17 between it and the bracket element, and thus prevents rotation or drooping of the mold with reference to the bracket. The member 17 (see Fig. 5) is formed with a slot or opening 19 which facilitates engagement of the member 17 with the bolt 14 when it becomes necessary to change the mold for any reason, as for instance, change in size of the fowl being processed or change in species of fowl, which, as will be appreciated, vary in external contour.

The fastening means just described also facilitates ready alignment of the upper and lower tube connections hereinafter referred to, and facilitates adjustment of the fowl so as to effectuate the proper water level at the vent.

The mold 18 preferably takes the form shown in Figs. 1 and 5. It is produced from aluminum or suitable alloy and small vent openings, as 30, extend through the wall thereof. The lower end of the mold is provided with an opening 20 for the insertion and passage of the freezing tube shortly to be described.

Inasmuch as it is desirable to conform the breast of the fowl and to hold the wings in against the side of the body, the mold is given the shape so that the breast of the fowl may conform thereto and be distended outwardly to the full extent and the wings held close to the body. In other words, the forward portion of the mold is rounded as at 21, and the rear portion of the mold is likewise rounded and flared rearwardly at 22, the curvature being formed upon a greater radius than that of the forward portion 21. Intermediate the curved sections 21 and 22, each side of the mold is cut away as at 23 and 24, respectively, such cut-away portions permitting the thigh and main leg portion of the fowl to extend upwardly without undue compression. The wings, however, are held in place against the body by the mold.

The fowl, of course, is drawn, the cavity cleaned and washed out, and the bony part of the neck severed from the carcass. Such portion and the giblets are introduced into the cavity within the body. The fowl is then ready for the insertion of the freezing tube, denoted by 25. Such tube, as above indicated, is preferably made of paper, paraffined or otherwise treated to render it moisture-proof.

The tube is positioned within the fowl and extends through the cavity therein and outwardly above and below the carcass. The tube is, of course, fragile, and to facilitate its introduction and passage into and through the carcass, there is preferably used a metallic tube 26 of larger interior diameter than the exterior diameter of the tube 25, said tube 26 being provided with a point or sharpened end 27.

The paper tube 25 is first inserted or housed within the outer metallic tube 26, which is of slightly greater length than the paper tube, as indicated in Fig. 2. The tube 26 is then forced into and through the carcass, the point of introduction being close to the neck, the bony portion of which, as above indicated, has been severed from the body. The paper tube which is housed within the metallic tube is, of course, carried along with the metallic tube as it passed through the carcass from the neck portion out through the vent. It is then in the position shown in Fig. 2. Thereupon, the tube 26 is withdrawn, but prior to its withdrawal, an elastic band as 28 is pushed over the skin of the neck of the fowl, and when this is done, the positioning tube 26 is withdrawn. This leaves the paper tube 25 in position with the skin of the neck and perhaps also a portion of the flesh adjacent the neck held tightly against and around the freezing tube at this point.

A sheet of Sylphrap, Cellophane or the like, as indicated by 29, having an opening 31 formed therein, is then positioned around that portion of the carcass adjacent the neck, the opening 31 facilitating the passage of the tube 25 therethrough. This sheet is drawn up and folded against the carcass by hand, after which the carcass with the tube 25 therein is placed neck downward in the mold, as indicated in Figs. 1 and 5.

The cavity within the carcass is then filled with pure cold water by any suitable means, as for instance by a nozzle 32 carried by a hose 33 which, in turn, is attached to a water line or main 34 supported in any suitable manner with reference to the molds. The water fills up all cavities within the carcass and as it is frozen, tends to expand slightly, which, of course, assists in a measure in conforming the carcass to the mold.

As indicated at the outset, the legs of the fowl will be drawn closely to the sides of the carcass by extending a rubber band as 35 over and between the same. (See Figs. 1, 4 and 5.) This band is drawn tightly about and around the legs of the carcass and passes rearwardly to and over a hook 10 extending outwardly from the rail or bar 11. The band when thus positioned, is under tension and has a tendency to draw the legs in against the carcass toward the vent opening, bringing the parts to the position approximating that which they would assume were the fowl trussed.

Any suitable means may be employed for passing a freezing medium through the tubes 25. In order to facilitate ready connection and disconnection of the upper and lower ends of the tube 25 with the suction and pressure lines, couplings such as best shown in Fig. 3 will preferably, but not necessarily, be employed. Such an arrangement includes an elongated metallic tubular member 36 having that end thereof which extends toward the tube 25 externally tapered and of a diameter such that it will pass readily into the open end of the tube 25. The member 36 is mounted in the end of a tubular rubber member 37 molded to form with the upper portion somewhat enlarged so as to permit the insertion of a metallic ring-shaped member 38 therein, the parts being held against separation by the usual groove and channel connection.

As will be seen, the member 38 extends downwardly and around the tapered or spigot end of the member 36, in spaced relation thereto, and the rubber element 37 is free of contact with the lower edge of the member 38 and the adjacent portion of the spigot-like member 36. This enables the operator to depress the ring-shaped member 38 and to insert the end of the tube 25 inwardly of said member, the end of the tube 25 coming into contact with the wall of the spigot 36 and the interior face of the tubular rubber member. In other words, when the member 38 is depressed, the bowed portion of the rubber member 37, which bowed portion is denoted by 39, is carried downwardly and away from the tapered spigot, allowing the end of the tube 25 to pass therebetween.

Upon release of the member 38, the inherent resiliency of the rubber will carry the parts to the position shown in Fig. 3, with the end of the tube 25 held in close binding contact with the spigot and the surrounding sleeve or element 37. This arrangement facilitates quick coupling and uncoupling of the tube 25 with the spigot member. The same arrangement is utilized at both ends of the tube 25.

The tube 25, as will be seen upon reference to Figs. 1 and 5, extends quite an appreciable distance beyond the carcass at the upper and lower portions thereof.

As above indicated, any suitable means may be employed for passing freezing medium through the tube 25. In the instant case, brine at a temperature of from 3° to 5° below zero, and at approximately 20 lbs. pressure, is employed. This has given highly satisfactory results in commercial operation.

To introduce and drain the brine from the tubes 25, the following layout is utilized: A pressure line 41 is connected through a branch 42, valve 43, T 44, nipple 45, and a rubber tube 46 with the lower end of the tubular member 36. A suction drain line is also present and is denoted by 48. It is interconnected with the T 44 through a nipple 49, valve 51 and a branch or lateral 52. The upper end of the freezing tube 25 is, as above noted, connected with a suction main denoted by 53. Such connection is had in the following manner: A coupling of the type above described and as shown in Fig. 3, is attached to the upper end of the freezing tube 25. At its opposite end the coupling is connected to a flexible pipe 54 which is in communication with the suction main 53, said main, moreover, being provided with a vent pipe 55 (Fig. 1).

Fowls, of course, vary in size, hence the upper coupling which is to be temporarily attached to the freezing tube is preferably adjustably supported or held in position, in order that it may be readily aligned with the upper end of the tube 25. To this end, and to allow the coupling to have a slight movement relative to said support, the following structure is utilized: An arm 56 is mounted upon the rail or bar 11 by a bolt 57 which passes through a washer 58 lying between the bar 11 and the under face of the arm 56. A washer 59 rests upon the upper face of the arm and a coil spring 61 encircles the upper portion of the bolt 57 and is held in place by a washer 62 and a nut 63.

The outer end of the arm 56 is attached by a bolt and spring connection similar to that just described, to a second arm 64, said arm at its outer portion having an opening 65 formed therein through which extends the rubber sleeve 37 of the detachable coupling, these parts being secured together by an ordinary hose clamp, as 60. This hose clamp prevents the detachable coupling and the tube 54 from dropping downwardly through the opening 65 when no paper tube is connected to the lower portion of the detachable coupling.

As will be best seen upon reference to Figs. 1 and 5, the opening 65 is sufficiently large to allow slight movement of the coupling with reference to the arm which normally positions the coupling in alignment with the tube 25. The springs tend to hold the arms 56 and 64 in their adjusted position with reference to each other and to the detachable coupling.

In operation, when the carcass with the Slyphrap sheet is placed in the mold, the openings 30 permit the drainage of any water from the form or mold which may run over when the operator is filling the cavity within the carcass. Such openings also facilitate the expulsion of air between the sheet and the mold when the sheet is forced downwardly against the mold by the full weight of the carcass.

The couplings being properly connected to the freezing tube, brine is passed upwardly through such tube to the suction main 53, at the temperature and pressure above indicated, and with or ordinary size chicken, the water within the cavity will be completely frozen and the body of the chicken likewise frozen to a considerable degree. When this stage is reached, valve 43 will be closed and valve 51 opened, so as to drain the brine from the tube 25.

When the valves are manipulated as just indicated, the paper tube is severed, it being cut close to the lower end of the mold or form, while leaving a projecting portion of say 3/4" in length above the carcass. It will, of course, be appreciated that the section of the freezing tube which remains within the carcass contains no ice or water, and if a liquid freezing medium be employed, it will drain therefrom immediately the tube is cut as just indicated.

The carcass may then be lifted from the mold, and the Sylphrap sheet 29 stripped therefrom. This sheet facilitates the removal of the fowl from the mold, as it prevents the carcass from being frozen to the same, which, if such freezing occurred, would tend to tear the skin and flesh of the fowl when one sought to separate the carcass from the mold. Hence, it will be seen that the carcass is conformed to the mold by its weight and the weight of the contained water which is transformed into ice, and it will be found that the carcass when so removed is free of any blemishes and has the same form and contour as does a well trussed fowl.

It will be appreciated, of course, that those portions of the tube 25 which remain in the respective couplings after severance of such member, will be withdrawn from such couplings immediately after the removal of the frozen carcass, or just prior to placing the next fowl in position for processing the same.

The Sylphrap sheet, as above indicated, is removed, as is also the rubber band which positions the legs with reference to the body, and the fowl is then carried into what is known as the zero or hardening room. There it remains until the carcass becomes completely solidified and frozen dry.

When this stage is reached, the fowl is carried into the packing or processing room, where a temperature of about 28° F. obtains. The operator then pushes the projecting ends of the tube back into the tube itself, closing up the air passage therethrough. The fowl is then ready for glazing, which is effected by immersing the fowl, one or more times, into a pail of clear cold water, which upon each immersion forms an ice coating over the entire exterior of the carcass. The carcass is then slipped neck-foremost into a bag formed of Sylphrap or similar material which is more or less impervious to both air and moisture. The bag is then sealed. This completes the operation.

A fowl thus processed may be kept for a long period of time provided it is maintained in cold storage. The fact that the fowl is cleaned shortly after it is dressed, and is then processed as above outlined, makes for the production of a product of high quality on every score.

By the method above set forth, the fowl is cleaned and dressed, ready to be cooked without further cleaning or dressing, as soon as the block of ice is melted or removed along with the paper freezing tube.

The utilization of a paper tube or conduit is advantageous from many points of view. Such tubes are sanitary and will impart no flavor to the fowl. The tube, moreover, does not have to be withdrawn until the fowl is to be cooked, and the fact that it is made of paper facilitates the turning in of the ends thereof, so as to close the tube against the ingress of any foreign substance.

What is claimed is:

1. That method of preserving dressed and drawn fowl, which comprises passing a tube through the carcass and the cavity therein, sealing the exterior of the tube adjacent its lower end with reference to the carcass, placing the carcass with the tube therein in a mold having a conformation substantially similar to the normal shape of the body of the fowl being processed, filling the cavity with water, and passing a refrigerant through the tube, whereby the water within the cavity is frozen, and the carcass is expanded against the mold due to the freezing of the water within the carcass.

2. That method of preserving dressed and drawn fowl, which consists in passing a conduit for a freezing medium through the carcass and the cavity therein, placing the carcass with the conduit therein in a mold substantially conformable to the shape of the breast, wings and adjacent body portion of a trussed fowl, filling the cavity in the carcass with water, drawing the legs against the carcass to simulate a trussed fowl, and thereafter passing a freezing medium through the conduit.

3. That method of preserving dressed and drawn fowl, which consists in passing a tube through the carcass and the cavity therein, placing the carcass in a mold having a contour conformable to the breast and oppositely disposed back surface with the sides of the mold cut away or depressed between the back and breast faces to accommodate the joints between the legs and thighs, filling the cavity in the carcass with water, positioning the legs of the fowl with reference to the body of the carcass to simulate a trussed fowl and securing them in such position, and passing a freezing medium through the tube.

JOHN N. CRIDER.